United States Patent [19]
Akiba

[11] Patent Number: 5,488,797
[45] Date of Patent: Feb. 6, 1996

[54] INTER-LINE FISHING ROD

[75] Inventor: Masaru Akiba, Tokyo, Japan

[73] Assignee: Daiwa Seiko, Inc., Tokyo, Japan

[21] Appl. No.: 91,064

[22] Filed: Jul. 14, 1993

[30] Foreign Application Priority Data

Jul. 14, 1992 [JP] Japan ................ 4-055249 U

[51] Int. Cl.⁶ .................................................. A01K 87/00
[52] U.S. Cl. .................................................. 43/18.1
[58] Field of Search .................. 43/18.1, 18.5, 43/24

[56] References Cited

U.S. PATENT DOCUMENTS

| | | | |
|---|---|---|---|
| 2,578,663 | 12/1951 | Beaupre | 43/18.1 |
| 2,808,676 | 10/1957 | Major | 43/18.5 |
| 3,088,239 | 5/1963 | Wever | 43/18.1 |
| 3,727,338 | 4/1973 | Rederser | 43/18.1 |
| 3,789,533 | 2/1974 | Bowerfind | 43/18.1 |
| 3,862,509 | 1/1975 | Petersen | 43/18.1 |
| 4,212,126 | 7/1980 | Barnett | 43/24 |
| 5,159,776 | 11/1992 | Horton | 43/24 |
| 5,175,952 | 1/1993 | Yamato | 43/18.1 |
| 5,245,779 | 9/1993 | Suzue | 43/18.5 |
| 5,299,377 | 4/1994 | Akiba | 43/24 |

FOREIGN PATENT DOCUMENTS

| | | | |
|---|---|---|---|
| 51-6072 | 2/1976 | Japan . | |
| 3049426 | 3/1988 | Japan | 43/18.1 |
| 63-34525 | 9/1988 | Japan . | |
| 63-169871 | 11/1988 | Japan . | |
| 3061030 | 3/1991 | Japan | 43/18.1 |

*Primary Examiner*—P. Austin Bradley
*Assistant Examiner*—James Miner
*Attorney, Agent, or Firm*—Longacre & White

[57] ABSTRACT

An inter-line fishing rod in which a fishing line is introduced into the inside of the rod and laid therein in the longitudinal direction of the rod. The rod is made up of a plurality of tubular members jointed together. The inside circumferential surface of the tubular member has a smooth curved portion at the rear end so as to prevent the fishing line from being damaged and cut off during fishing.

8 Claims, 5 Drawing Sheets

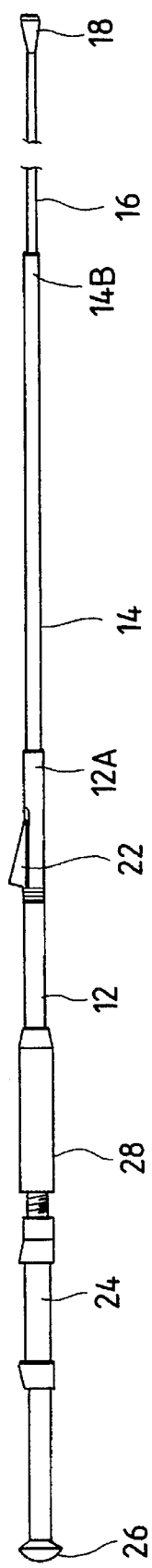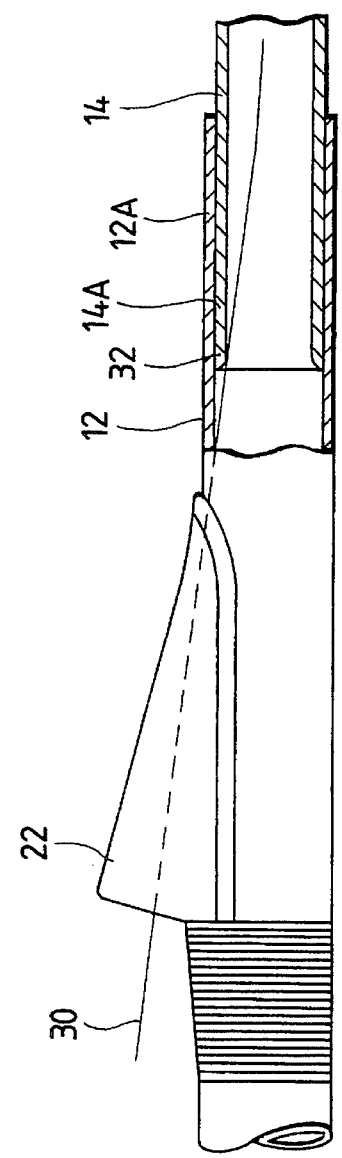

INTER-LINE FISHING ROD

BACKGROUND OF THE INVENTION

The present invention relates to an inter-line fishing rod in which a fishing line is introduced into the inside of the fishing rod and laid therein in the longitudinal direction of the rod.

An inter-line fishing rod is used for such purposes that a fishline is prevented from tangling on an obstacle around a fishing site, loosening between fishline guides and tangling on the guide. However, such inter-line fishing rod suffers from two problems in that if the fishline is wound on a reel while moving in contact with the edge of the inside circumferential surface of each of mutually-coupled tubular members of the fishing rod, the edge being located at the rear end of each tubular member, then the fishline is likely to be damaged or cut off, and that the inside circumferential surface of the rod is worn by the fishing rod for a long time period of use.

There exist two proposals directed to solving the former problem. The Japanese Utility Model Application No. 34525/88 discloses an inter-line fishing rod in which a pipe element having a fishline guide ring is attached to the rear end of each of tubular members. The Japanese Patent Application No. 6072/76 discloses an inter-line fishing rod in which a protective ring made of steel or the like is secured to the rear end of each of tubular members by an adhesive or the like.

As for the former method of solving the above-mentioned first problem, since the pipe element is protruded from the rear end of the tubular member, the weight of the tubular members located in front of the pipe is likely to impulsively act to the pipe at the time of telescopic collapsing of the fishing rod so as to uncouple the member and the pipe from each other or damage the screw-threaded portion between the pipe element and the tubular member. Since the screw-threaded portion necessitates large thickness, the weight of the fishing rod is unavoidably increased. Besides, a fishline is likely to come into contact with the edge of the element except for the fishline guide ring so as to be damaged or cut off.

As for the latter method of solving the above-mentioned first problem, a fishline is likely to come into contact with the edge of the protective ring so as to be damaged or cut off even if the ring is made of a substance low in coefficient of friction.

There exists one proposal directed to solving the second problem in the inter-line fishing rod. The Japanese Utility Model Application (OPI) No. 169871/88 (the term "OPI" as used herein means an unexamined published application") discloses an inter-line fishing rod in which the inside circumferential surface of each tubular member is constituted by a ceramic fiber layer to enhance the wear resistance of the surface.

According to this proposal, the wear resistance of the inside circumferential surface of each tubular member of the inter-line fishing rod may be enhanced. However, the frictional resistance of the surface is increased to make it difficult for a user to introduce the fishline into the inside the rod. Particularly if the fishline is wet with water, the frictional resistance of the surface so high that the fishline cannot smoothly be put into and out of the rod.

SUMMARY OF THE INVENTION

The present invention was made in order to solve the problems described above.

Accordingly, it is an object of the invention to provide an inter-line fishing rod in which a fishing line is introduced into the inside of the fishing rod and laid therein in the longitudinal direction of the rod, and which is less in weight and high in reliability that the fishline is surely prevented from being damaged or cut off.

Another object of the invention to provide an interline fishing rod into and out of which a fishline can be smoothly put even if it is wet with water.

In order to attain the above-noted and other objects, the present invention provides an inter-line fishing rod characterized in that the inside circumferential surface of each of mutually-coupled tubular members of the rod has a smooth curved portion at the rear end of the member. Since the inside circumferential surface of each of the mutually-coupled tubular members of the fishing rod provided in accordance with the present invention has the smooth curved portion which guides the fishline when it is wound or unwound in contact with the rod, it does not act to damage or cut off the fishline.

The present invention further provides a fishing rod formed by a prepreg made of a synthetic resin and high-strength fibers impregnated with the resin, in which a coating film layer made of a water-repelling substance low in coefficient of friction is provided to constitute the inside circumferential surface of the rod. Since the inside circumferential surface of each tubular member of the fishing rod provided in accordance with the present invention is constituted by the coating film layer made of the water-repelling substance low in coefficient of friction, the frictional resistance of the member to the fishline is so low that it can be smoothly guided in the member to be put into and out of it.

In order to form the smooth curved portion and/or the coating film layer according to the present invention, a woven or non-woven fabric made from alumina fibers, carbon fibers, fluorocarbon fibers, silicone fibers or the like and impregnated with resins, or a coating paint made of fluorocarbon resins or silicon resins or made of epoxy resins in which fine particles of fluorine, molybdenum, silicon or the like are dispersed, can be used as material. A sheet or tape of fluorocarbon resins or silicon resins is also usable.

BRIEF DESCRIPTION OF THE DRAWINGS

In the accompanying drawings:

FIG. 1 is a side view of an inter-line fishing rod which is an embodiment of the present device;

FIG. 2 is a cutaway view of a major part of the rod;

DETAILED DESCRIPTION OF THE PREFERRED EMBODIMENTS

Figure 3:
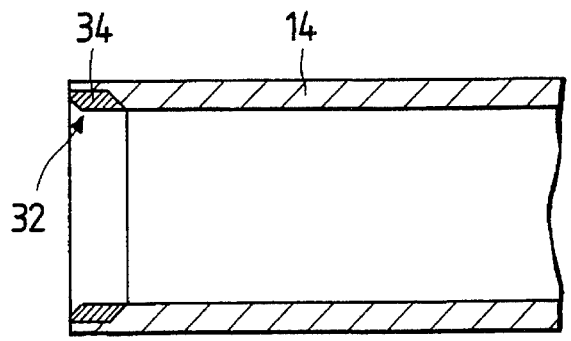
FIG. 3 is a sectional view of the rear part of the intermediate tubular member of the rod.

Preferred embodiments of the present invention will now be described with reference to the drawings attached hereto.

FIG. 1 is a side view of an inter-line fishing rod which is an embodiment and in which a fishline is introduced into the inside of the rod and laid therein in the longitudinal direction of the rod. The fishing rod includes a posterior tubular member 12, an intermediate tubular member 14, an anterior tubular member 16, a tip guide 18 through which the fishline is put out of the fishing rod, and a posterior guide 22 through which the fishline is put into the rod. Note that although the fishing rod is made up of three tubular members 12, 14 and 16 in this embodiment, the invention should not be restricted thereto or thereby. The invention is applicable to a fishing rod made up of only two tubular members or four or more tubular members.

The posterior tubular member 12 includes a reel rest 24, a butt portion 26, and a grip 28. The posterior guide 22 is provided on the front part 12A of the posterior tubular member 12 so that the fishline extending from a reel mounted on the reel rest 24 is guided to smoothly move into or out of the member. The rear part 14A of the intermediate tubular member 14 is fitted in the front part 12A of the posterior tubular member 12 so that the members are coupled to each other, as shown in FIG. 2 which is a cutaway view of the fishing rod. The rear part of the anterior tubular member 16 is fitted in the front part 14B of the intermediate tubular member 14 so that the members are coupled to each other. The tip guide 18 is attached to the anterior tubular member 16 at the tip thereof.

Figure 4:
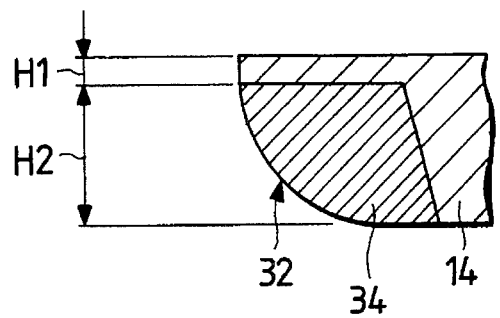
FIG. 4 is an enlarged sectional view of the rear part.
Figure 5:
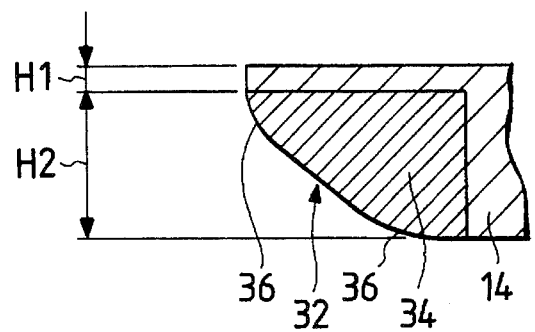
FIG. 5 is an enlarged sectional view of a rear part which is a modification of the former rear part.

As shown in FIG. 3, the member 14 has a fishline guide portion 34 integrally provided on the main body of the member and having a smooth curved surface flush with the inside circumferential surface of the main body and constituting most of the rear end 32 of the member. As a result, the fishline 30 does not come into contact with the edge of the inside circumferential surface of the member 14 at the rear end 32 thereof. Therefore, the fishline 30 is prevented from being damaged or cut off because of coming into contact with the edge. The smooth curved surface of the fishline guide portion 34 is curved as a single arc as shown in FIG. 4, but may be replaced by either a combination of a flat surface and curved surfaces 36 adjoining both the edges of the flat surface and each shaped as an arc as shown in FIG. 5, or a combination of curved surfaces. It is preferable that, in cross-section, one end of the curved surface of the fishline guide portion 34 is flush with an longitudinal end surface of the member 14 whereas the other end of the curved surface is flush with the inside circumferential surface as shown in FIGS. 3–5.

The curved surface of the portion 34 is smoothly polished as described hereinafter.

It is preferable that the fishline guide portion 34 is made of a substance high in wear resistance and fishline slipping property. For example, the portion 34 is made of alumina fibers, carbon fibers, fluorine fibers, silicon fibers or the like, and a resin impregnated therein. It is preferable that the thickness H2 of the fishline guide portion 34 is larger than that H1 of the rear end portion of the main body of the member 14 to cause the fishline 30 to come into contact with the fishline guide portion.

Such a fishline guide portion is also integrally provided on the main body of the anterior tubular member 16 at the rear end thereof.

Figure 6:
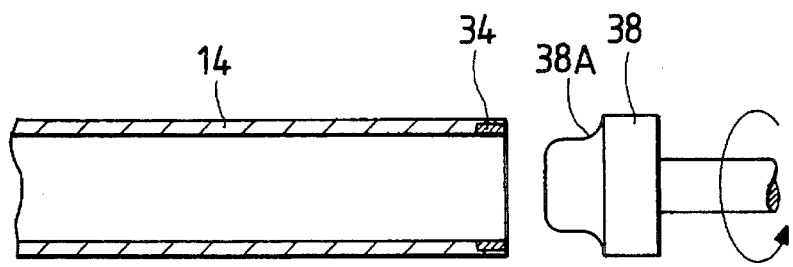
FIG. 6 is a view to illustrate the cutting of the fishline guide portion of the member in a method of manufacturing the portion.
Figure 7:
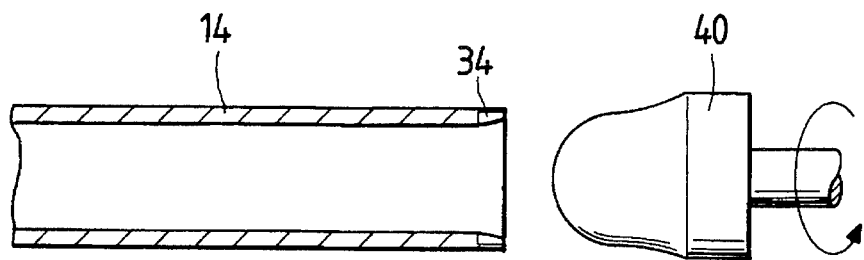
FIG. 7 is a view to illustrate the polishing of the fishline guide portion after the cutting.

One example of a method of manufacturing the fishline guide portion 34 is described with reference to FIGS. 6 and 7 from now on. A bundle or sheet of alumina fibers or the like, which are oriented in one direction and impregnated with a synthetic resin, is wound around a mandrel in a prescribed position so that the fibers extend in the circumferential direction of the mandrel. A fiber-reinforced prepreg for making the main body of the intermediate tubular member 14 is thereafter wound around the bundle or sheet and the mandrel. The bundle or sheet and the prepreg are then subjected to a conventional thermosetting treatment so that the tubular member 14 having the main body and the fishline guide portion 34 is formed. The edge of the inside circumferential surface of the portion 34 at the rear end of the member 14 is then formed into a desired curved shape with a diamond cutter 38 having a curved surface making portion 38A. The curved surface is then smoothly polished by a polisher 40 having a buffing cloth or felt. Although the curved surface is sometimes made slightly wavy by the polishing due to the nonuniformity of the density of the fibers of the surface, it is no problem as far as the surface is not rugged.

Figure 8:
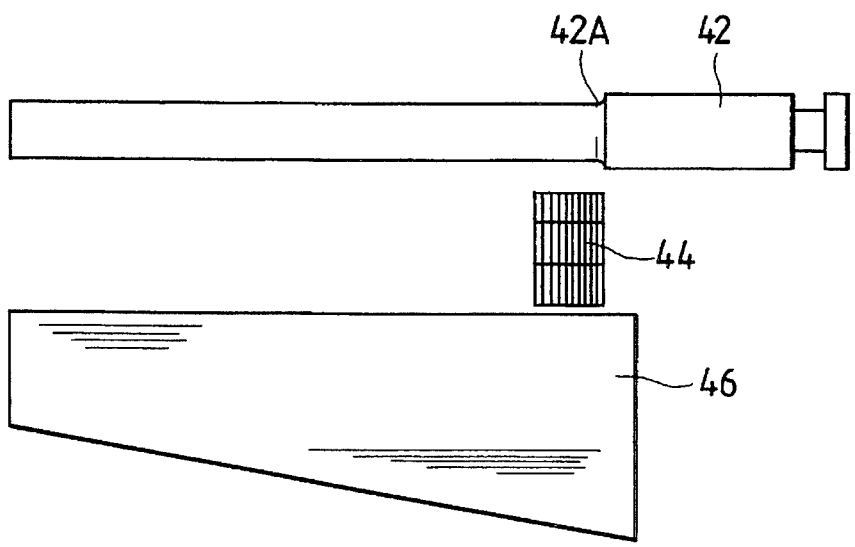
FIG. 8 is a view to illustrate another method of manufacturing the fishline guide portion.
Figure 9:
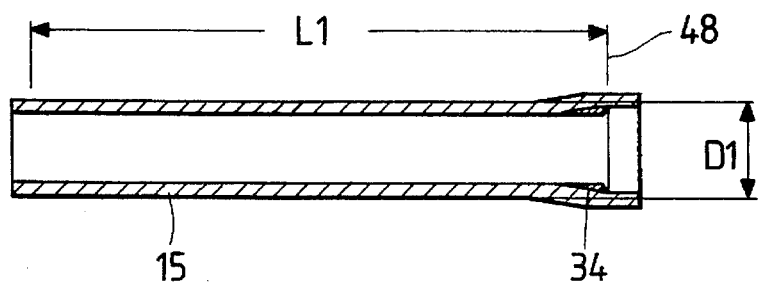
FIG. 9 is a view to illustrate cutoff work after the forming of the portion in the latter method.

Another method of manufacturing the fishline guide portion 34 is described with reference to FIGS. 8 and 9 from now on. A mandrel 42 provided at a prescribed position with a curved surface 42A smoothly polished as the reflective surface of a mirror is prepared. A prepreg 44 made of a synthetic resin and fluorine fibers oriented in a direction and impregnated with the resin is wound around the curved surface 42A of the mandrel 42 so that the fibers extend in the circumferential direction of the mandrel. A fiber-reinforced prepreg 46 whose fibers are oriented mainly in the longitudinal direction of the prepreg and which is for making the main body of the intermediate tubular member 14 is thereafter wound around the former prepregs 44 and the mandrel 42. The prepregs 44 and 46 are then subjected to a conventional thermosetting treatment so that a tube 15 is formed. The tube 15 is cut off to a prescribed length L1 so that the thermoset prepreg 44 forming the fishline guide portion 34 is located at the outer end 48 of the fishing rod. If the end of the fishline guide portion 34 is not coincident with the outer end 48 of the fishing rod after the above-noted cutting process, the tube is further subjected to finishing work to make both the ends coincide with each other. The outside circumferential surface of the tube 15 is thereafter processed to have a prescribed outside diameter D1 so that the intermediate tubular member 14 is formed. In this method, the inside surface of the tube 15 does not need to be subjected to relatively difficult processing such as that performed in the former method as described in connection with FIGS. 6 and 7. Thus, the rod or member having the fishline guide portion 34 can be manufactured with easy process such as the processing of the outside circumferential surface of the tube 15 or the like.

Yet another method of manufacturing the fishline guide portion 34 may be adopted. In the method, an element shaped as the portion 34 is first fitted on a mandrel, and a fiber-reinforced prepreg is then wound around the element and the mandrel and subjected to a conventional thermosetting treatment so that the intermediate tubular member 14 having the element integrally conjoined to the main body of the member is formed. A contact surface of the element with the prepreg may be provided with small grooves or recesses to receive the resin of the prepreg therein to more firmly conjoin the main body and the element forming the fishline guide portion 34 to each other.

Since the fishline guide portion 34 is integrally conjoined to the main body of the member 14 although the portion is made of the element separately prepared beforehand, the portion is not separated from the main body by an impact on the fishing rod at the time of telescopic collapsing thereof or the like. Such separation is structurally unlikely for the fishline guide portion 34 manufactured in each of the preceding methods.

Since the inside diameter of the fishline guide portion 34 is equal to that of the main body of the member 14, namely, the portion does not project inward from the inside circumferential surface of the main body, an impact or the like does not act to the portion at the time of telescopic collapsing of the fishing rod or the like. However, the portion 34 may project inward from the inside circumferential surface of the main body.

In addition, if the main body of the tubular member 14 is made of the materials such as alumina fibers, carbon fibers, fluorocarbon fibers or the like and a resin impregnated therein which are used to form the fishline guide portion, the body and the fishline guide portion 34 are integrally and monolithically formed of the materials without any separate members such as the bundle or sheet, the prepreg 44 and the element respectively used in the first, second and third methods.

An inter-line fishing rod having a fishline guide portion of the tubular member in accordance with the present invention is small in size and weight. Since the fishline is guided by the smooth curved surface of the portion, the fishline is unlikely to be damaged or cut off due to the guiding. The portion is integrally provided on the main body of the tubular member so as not to be separated from the body by an impact or the like. Therefore, the reliability of the rod is high.

Figure 11:
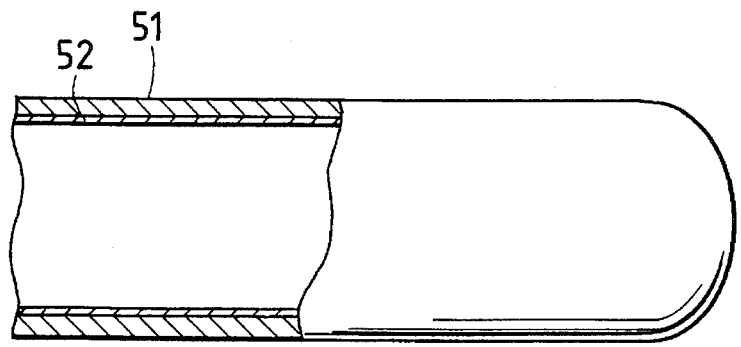
FIG. 11 is a cutaway side view of the rod shown in FIG. 10.
Figure 10:
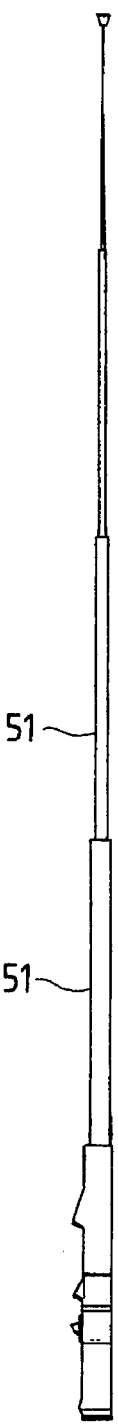
FIG. 10 is a side view of a fishing rod which is another embodiment of the present device.
Figure 12:
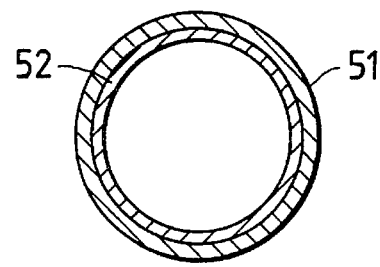
FIG. 12 is a cross-sectional view of the rod shown in FIG. 10.

FIGS. 10, 11 and 12 show an inter-line fishing rod which is another embodiment of the present invention.

The fishing rod includes tubular members 51, each of which is made of a wound prepreg and a coating film layer 52 provided on the inside surface of the prepreg and constituting the inside circumferential surface of the member.

To form the coating film layer for each tubular member of the rod, a woven or non-woven fabric made from fluorocarbon fibers, silicone fibers or the like and impregnated with resins, a sheet or tape of fluorocarbon resins, silicone resin or the like, or a coating paint of fluorocarbon reins, silicone resin or the like, or of a mixture of an epoxy resin and fine grains or particles of fluorine, molybdenum, silicon or the like which are 10μ or less in diameter, can be used as material. The thickness of the coating film layer is 500μ or less, preferably 20 to 200μ.

One example of a method of manufacturing each of the tubular members 51 is described as follows: a separating agent is first applied to a mandrel, and a fluorocarbon resin paint for making the coating film layer 52 is then applied to the agent. After the agent and the paint have dried spontaneously, the prepreg made of a thermosetting synthetic resin such as an epoxy resin and high-strength fibers impregnated with the resin is wound around the agent and the paint on the mandrel, and a tape is then wound around them. The assembly of these materials is then subjected to a thermosetting treatment so that the tubular member is formed. After that, the tape and the mandrel are removed from the prepreg and the coating film layer 52 integrally provided on the inside circumferential surface of the prepreg. Instead of the fluorocarbon resin paint, a tape, a sheet or a woven or non-woven fabric may be wound around the mandrel.

Since the coating film layer 52 is made of a water-repelling substance low in coefficient of friction, the frictional resistance of the film layer to the fishline is so low that the fishline can be smoothly guided in each of the tubular members 51 to be put into and out of it, even if the fishline is wet with water.

Figure 13:
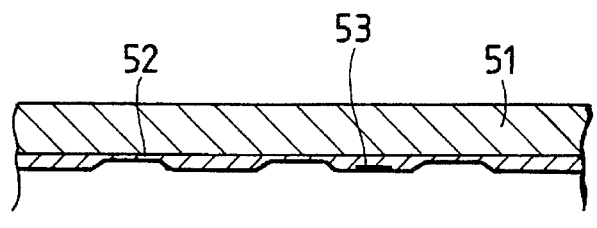
FIG. 13 is a longitudinally sectional view of a fishing rod which is a modification of the embodiment shown in FIG. 10.

Although the thickness of the coating film 52 is uniform in the embodiment, the present invention is not confined thereto but may be otherwise embodied so that a coating film 52 having inner annular projections 53 as shown in FIG. 13 is provided to have a smaller area of contact with the fishline than the former coating film.

Since the inside circumferential surface of each tubular member of an inter-line fishing rod which is provided in accordance with the present device is constituted by a coating film layer made of a water-repelling substance low in coefficient of friction and integrally provided on the other portion of the tubular member, the frictional resistance of the member to the fishline is so low that the fishline can be smoothly guided in the member to be put into and out of it, even if the fishline is wet with water. A desirable effect is thus produced.

Figure 14:
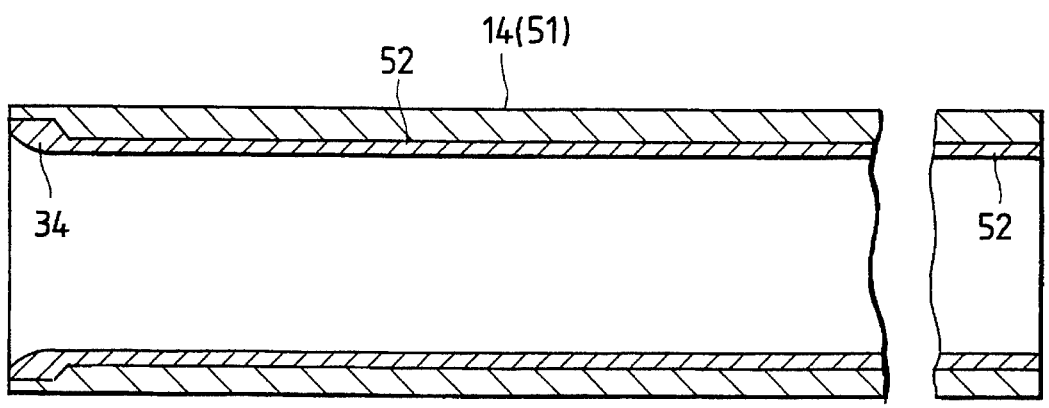
FIGS. 14 is a longitudinally sectional view of a fishing rod which is yet another embodiment of the present invention.
Figure 15:
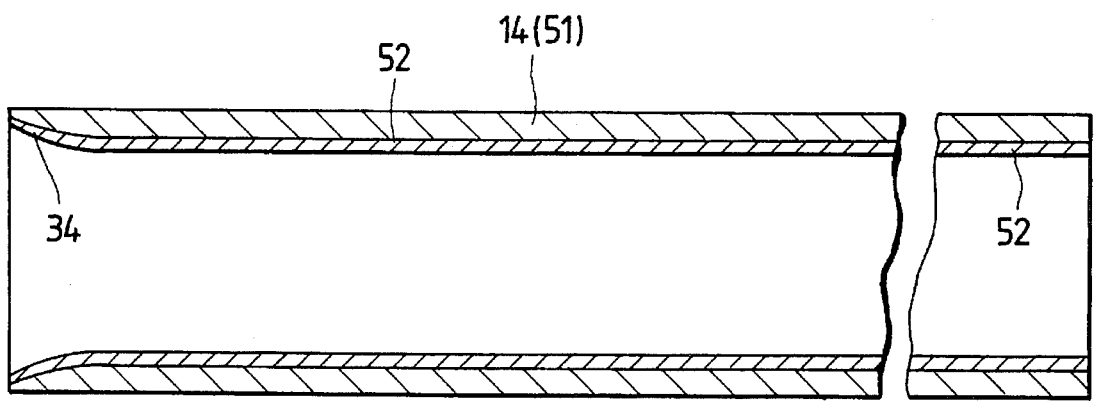
FIG. 15 is a longitudinally sectional view of a fishing rod which is further another embodiment of the present invention.

A tubular member of an inter-line fishing rod in accordance with the present invention may have both the curved fishline guide portion 34 and the coating film layer 52 as shown in FIGS. 14 and 15.

An example of manufacturing processes for a tubular member shown in FIG. 14 is described hereunder. A separating agent is applied to a mandrel entirely, and a coating paint of epoxy resins with molybdenum particles dispersed therein is applied to the separating agent around the mandrel entirely. After the agent and the paint have dried, a woven or non woven fabric made from alumina fibers and impregnated with epoxy resins is wound on the thus dried coating paint around the mandrel at a prescribed position, and a fiber reinforced prepreg for making the main body of the tubular member 14 (51) is thereafter wound on the fabric and the coating paint around the mandrel. The assembly is then subjected to a conventional thermosetting treatment so that the tubular member 14 having the fishline guide portion 34 and the coating film layer 52 is formed. The edge of the inside circumferential surface of the portion 34 at the rear end of the member 14 is then formed into a desired curved shape with the diamond cutter 38 shown in FIG. 6 and smoothly polished with the polisher 40 shown in FIG. 7. In addition, the woven or non-woven fabric may be wound around the mandrel prior to application of the coating paint.

An example of manufacturing processes for a tubular member shown in FIG. 15 is described hereunder. A separating agent is first applied to the mandrel 42 shown in FIG. 8 entirely, and a coating paint of fluorocarbon resins is applied to the separating agent around the mandrel 42 entirely. After the agent and the paint have been dried, a prepreg made of thermosetting synthetic resin and reinforcing fibers is wound thereon around the mandrel. Then, the assembly is subjected to a thermosetting treatment in a usual manner so that the tubular member 14 (51) having both the fishline guide portion 34 and the film layer 52 is molded. Thereafter, the tubular member 14 (51) is subjected to the cutting process and so on to have prescribed length and diameter.

What is claimed is:

1. An inter-line fishing rod in which a fishline is introduced into an inside of the rod and laid therein in a longitudinal direction of the rod, and which includes at least first and second members each formed with inner and outer circumferential surfaces and front and rear longitudinal end surfaces, wherein said inner circumferential surface of said first member near said front longitudinal end surface of said first member is adapted to be fitted on said outer circumferential surface of said second member near said rear longitudinal end surface of said second member, said rod comprising an improvement wherein said inner circumferential surface of said second member is conjoined to said rear longitudinal end surface of said second member through a smooth curved surface, said smooth curved surface comprising first and second ends, said first end being conjoined to said rear longitudinal end surface of said second member and said second end being conjoined to said inner circumferential surface of said second member, and wherein a first radial distance from said inner circumferential surface of said second member to said first end is greater than a second radial distance from said first end to said outer circumferential surface of said second member to thereby efficiently guide said fishline in said longitudinal direction of said rod; and wherein said curved surface is defined by a fishline guide portion integrally molded in a reduced cross-section portion of said second member, and said fishline guide portion reinforces and strengthens said reduced cross-section portion.

2. The rod according to claim 1, wherein said curved surface is located within a space defined by said inner and outer circumferential surfaces and front and rear end surfaces of said second member.

3. The rod according to claim 1, wherein a tangential line with respect to said curved surface at said first end is located on said rear longitudinal end surface of said second member.

4. The rod according to claim 1, wherein a tangential line with respect to said curved surface at said second end is located on said inner circumferential surface of said second member.

5. The rod according to claim 1, wherein said smooth curved surface is contained within a cylindrical area bounded by said outer circumferential surface, and said front and rear longitudinal end surfaces.

6. The rod according to claim 1, wherein said fishline guide portion is made of one of (1) a woven or non-woven fabric made from one of alumina fibers, carbon fibers, fluorocarbon fibers and silicone fibers and impregnated with resins, (2) a coating paint made of one of fluorocarbon resins and silicon resins, (3) a coating paint made of epoxy resins in which fine particles of one of fluorine, molybdenum and silicon are dispersed, and (4) a sheet or tape made of one of fluorocarbon resins and silicon resins.

7. The rod according to claim 1, wherein said second member includes a radially innermost layer defining said inner circumferential surface, and said innermost layer is made of substantially the same material as that of the fishline guide portion.

8. The rod according to claim 1, wherein said smooth curved surface is contained within a annular area bounded by said inner and outer circumferential surfaces.

* * * * *